United States Patent Office 3,441,524
Patented Apr. 29, 1969

3,441,524
SELF-EXTINGUISHING THERMOPLASTIC
COMPOSITIONS
Heinz Burger, Ludwigshafen (Rhine), Heinrich Mohr and Edmund Priebe, Frankenthal, Pfalz, and Lothar Reuter and Heinz Weber, Ludwigshafen (Rhine), Germany, assignors to Badische Anilin- & Soda-Fabrik Aktiengesellschaft, Ludwigshafen (Rhine), Germany
No Drawing. Filed Aug. 16, 1966, Ser. No. 572,680
Claims priority, application Germany, Aug. 25, 1965,
B 83,428
Int. Cl. C08g 47/08, 47/10; C09k 3/28
U.S. Cl. 260—2.5                                8 Claims

ABSTRACT OF THE DISCLOSURE

The invention relates to an improved self-extinguishing composition comprising a styrene polymer, an organic bromide and a synergistic phenyl alkane compound. The composition can also contain a foaming agent.

This invention relates to self-extinguishing thermoplastic compositions containing styrene polymers organic bromides, and synergistic organic compounds.

The term "self-extinguishing" as employed herein in respect to thermoplastic compositions means that moldings prepared from such compositions are incapable of supporting a flame for more than 20 seconds after they have been held in an open flame, ignited and then removed from the flame with a gentle movement.

It is known that compounds containing halogen can be used as fire-retarding agents for self-extinguishing thermoplastic polymers. In order to render the polymer, e.g. a styrene polymer, self-extinguishing or non-flammable it is necessary to incorporate relatively large amounts of organic halides. Many of the properties of the polymers, e.g. the tensile strength, impact strength and heat distortion temperature of the polymers, are however thereby deleteriously affected.

It is also known that the fire-retarding effect of organic halides dispersed in the polymers can be enhanced by additives so that adequate fire-retarding action can be achieved by much smaller amounts of these substances. Thus it is possible to improve the fire-retarding action of organic bromides by admixing organic peroxides. Organic peroxides have the disadvantage however that they are toxic and sometimes readily decompose explosively. Susceptible persons handling such peroxides may contract dermatosis. Moreover expensive and troublesome precautions must be taken in handling peroxides to avoid explosions. It is also known that peroxides slowly decompose even at room temperature so that polymer compositions containing organic bromides and peroxides may lose their self-extinguishing characteristics in storage. Furthermore the mechanical properties of polymer compositions containing peroxides undergo gradual deterioration by degradation of the polymer chains.

It is an object of the present invention to provide self-extinguishing thermoplastic compositions comprising styrene polymers and organic bromides which do not have the disadvantages of the prior art compositions.

Another object of the present invention is to provide self-extinguishing or non-flammable thermoplastic compositions comprising styrene polymers and organic bromides in which the content of organic bromides is substantially smaller than that conventionally required for flame-proofing the same polymer with the same organic bromide to the same degree.

A further object is to provide self-extinguishing thermoplastic compositions which can be handled without special precautions.

A still further object of the invention is to provide improved molding materials which may be used for the production of self-extinguishing moldings and contain a styrene polymer and an organic bromide as flame-proofing agent. Yet another object is to provide improved normally solid thermoplastic polymer compositions capable of being foamed to form self-extinguishing cellular articles and comprising a styrene polymer, an organic bromide and a volatile organic compound as foaming agent.

In accordance with the invention, improved self-extinguishing and/or flame-retardant styrene polymers are provided which contain the organic bromide in combination with 0.01 to 5%, preferably 0.02 to 2%, by weight with reference to the styrene polymer, of at least one compound (C) having the formula

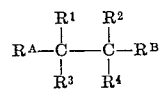

in which $R^A$ and $R^B$ are identical or different and denote an unsubstituted phenyl radical or a phenyl radical substituted by at least one aliphatic hydrocarbon having 1 to 3 carbon atoms, a chlorine, a bromine or an alkoxy having 1 to 4 carbon atoms; $R^1$ and $R^2$ are identical or different and denote hydrogen, chlorine, bromine, the radical of an aliphatic hydrocarbon having 1 to 6 carbon atoms, preferably methyl, or denote cyclohexyl; $R^3$ and $R^4$ are identical or different and denote chlorine, bromine, cyano, nitro, or preferably the radical of an aliphatic hydrocarbon having 1 to 6 carbon atoms or phenyl.

Compounds having the said formula enhance the flame-proofing effect of the organic bromides and will hereinafter be referred to as synergistic compounds or simply synergists.

Examples of suitable synergistic compounds are 2,3-dimethyl-2,3-diphenylbutane, 2,3-diethyl - 2,3 - diphenylbutane, 2,3-dimethyl-2,3-di-p-tolylbutane, 2,3 - dimethyl-2,3-di-p-bromophenylbutane, 2,3-diethyl-2,3-di-p - chlorophenylbutane, 2,3-dimethyl-2,3-di-p-ethoxyphenylbutane, 2,2,3,3-tetraphenylbutane, 1,2 - dibromo-1,2-dimethyl-1,2-diphenylethane, 1,2-dibromo-1,2-diphenylethane, 1,2-dinitro-1,2-diphenylethane, 1,2-dinitro-1,2-di-p-tolylethane, 2,3-dicyano-2,3-diphenylbutane, 1,2-dichloro-1,2-diphenylethane and mixtures of these compounds.

Those compounds of the said formula are preferred in which $R^1$ and $R^2$ and/or $R^3$ and $R^4$ are identical and in which $R^1$ and $R^2$ and/or $R^3$ and $R^4$ denote methyl or ethyl radicals.

The term "styrene polymer" as used in the present specification means a normally solid polymer of unsubstituted styrene or a substituted styrene having the formula $$Ar—CH=CH_2$$

wherein Ar represents an aromatic hydrocarbon radical. Examples of substituted styrenes are vinyltoluene, vinylxylene, isopropenylstyrene, tert.-butylstyrene, α-methylstyrene and mixtures of these monomers with one another and/or with styrene. Styrene itself is preferred.

The styrene polymers comprise in chemically combined form at least 50% and preferably at least 70% by weight of one of the styrenes. The term "styrene polymer" includes well-known addition copolymers of styrene or substituted styrenes with less than 50% and preferably less than 30% by weight of at least one other readily polymerizable olefinically unsaturated compound having the group $CH_2=C<$, such as α-methylstyrene, methacrylonitrile, acrylonitrile, esters of acrylic or methacrylic acid and alkanols having 1 to 8 carbon atoms, vinylpyridine, N-vinylcarbazole and butadiene. Examples of suitable copolymers are copolymers of 70 to 80% by weight of styrene and 20 to 30% by weight of acrylonitrile, 70 to 80% by weight of styrene and 20 to 30% by weight of α-methylstyrene, 75 to 85% by weight of styrene and 15 to 25% by weight of methyl methacrylate, or 90 to 95% by weight of vinyltoluene and 5 to 10% by weight of vinylpyridine. Copolymers of styrene which contain from 0.001 to 1.0% and preferably from 0.01 to 0.1% by weight of divinylbenzene units may also be used for the purposes of this invention.

The term "styrene polymer" also includes impact-resistant grades as prepared by mixing polystyrene or any of the said styrene copolymers with minor amounts, e.g. 2 to 15% by weight on the styrene polymers of elastomeric polymers such as natural or synthetic rubber or elastomeric polymers of esters of acrylic or methacrylic acid with alkanols having 4 to 8 carbon atoms. The impact-resistant styrene polymers may also be prepared by polymerizing styrene or a mixture of at least 50% and preferably 70% by weight of styrene and another olefinically unsaturated monomer as mentioned above in the presence of 2 to 10% by weight on the monomers of a finely divided elastomeric polymer such as natural or synthetic rubber.

The organic bromides used are those conventionally employed as flame-proofing agents. They preferably contain at least four carbon atoms and have a plurality (at least two) of bromine atoms attached to the carbon atoms. The bromine atoms should make up more than 40% by weight of the organic bromide.

Those organic bromides are particularly suitable which are not volatile, which have little or no plasticizing action on the styrene polymers and which have no troublesome odor. Organic bromides containing a plurality of bromine atoms in an aliphatic or cycloaliphatic radical are very suitable. In these organic bromides the bromine atoms are preferably attached to adjacent or vicinal carbon atoms in the aliphatic or cycloaliphatic radical. Examples of suitable organic bromides are bromosubstituted alkanes, such as 1,2,3,4-tetrabromobutane, 1,2,4-tribromobutane or tetrabromopentane, bromo-substituted cycloalkanes such as tribromotrichlorocyclohexane tetrabromodichlorocyclohexane, pentabromomonochlorocyclohexane, hexabromocyclohexane, 1,2,5,6,9,10-hexabromocyclododecane or octabromohexadecane and also dibromoethylbenzene, 1,2-di-(dibromomethyl)-benzene and pentabromodiphenyl ether, esters and acetals of dibromopropanol, such as tris-(2,3-dibromopropyl)-phosphate and esters of bromoalkanoic acids such as methyl-, β-dibromopropionate. Bromination products of linear and cyclic oligomers or polymers of butadiene or isoprene, such as hexabromocyclododecane and octabromohexadecane, or brominated natural or synthetic rubber are especially suitable.

The minimum amount of organic bromide to be contained in the composition depends upon the nature of the organic bromide and the styrene polymer. The organic bromides are used in such amounts that the compositions or molding materials have a bromine content of at least 0.1% by weight and as a rule not more than 5% by weight, preferably 0.5 to 3% by weight. Usually, the amount of organic bromide used is substantially smaller than is required to render the polymer non-flammable or self-extinguishing if the organic bromide is used alone. If the organic bromide is employed in an amount sufficient to render the polymer self-extinguishing, the compositions are flame-proofed more effectively by incorporating a synergistic compound (c) according to this invention.

The compositions may be mixed with additives, for example fillers, pigments, lubricants, plasticizers, antistatics, aging retardants, stabilizers or compounds which promote expansion.

The compositions or molding materials may be in finely divided form, for example in the form of beads or cylindrical granules or in the form of lumps such as are obtained by grinding bulk polymers. The particles advantageously have a diameter of 0.1 to 6 mm., preferably about 0.4 to 4 mm.

The molding materials may be processed, for example by injection molding or extrusion, into self-extinguishing moldings or profiles. Because of their relatively low content of organic bromides the molding materials according to this invention have softening points which differ only slightly from those of the styrene polymers contained therein.

Compositions or molding materials according to this invention which are capable of being foamed to form self-extinguishing expanded articles are of particular interest. They contain, besides a styrene polymer, an organic bromide and a synergistic compound, also a volatile organic compound as foaming agent. Preferred foaming agents are liquid or gaseous organic compounds which do not dissolve the styrene polymer and whose boiling point is below the softening point of the polymer, for example saturated aliphatic or cycloaliphatic hydrocarbons containing 3 to 7 carbon atoms in the molecule, such as propane, butane, pentane, hexane, heptane, cyclohexane or petroleum ether, or halohydrocarbons preferably chlorohydrocarbons or fluorohydrocarbons having 1 to 6 and particularly 1 to 4 carbon atoms, such as methyl chloride, dichlorodifluoromethane or 1,2,2-trifluoro-1,1,2-trichloroethane. Mixtures of two or more of the said agents may also be used. Very suitable foaming agents have a molecular weight of at least 58 and a boiling temperature below 95° C. at 760 mm. pressure. The amount of foaming agent must be sufficient to provide enough vapor to expand the polymer to an article of cellular structure. It is advantageous to use 3 to 12% by weight of foaming agent on the styrene polymer.

Self-extinguishing foamed articles are obtained from such expandable compositions or molding materials for example when fine particles of these materials are heated in a gas-permeable mold to a temperature above the softening point of the styrene polymer contained in the composition so that the particles expand and fuse together into a molding. The expandable molding material may also be processed into foam sheet by means of extruders.

To prepare self-extinguishing foam sheet, the components of the compositions or molding materials may be mixed with a foaming agent. Mixing is advantageously carried out in continuous equipment, for example in an extruder. Temperatures are used which are above the softening point of the polymer. The mixture should be kept under a pressure which is at least equal to that of the pressure produced by the foaming agent to avoid the mixture expanding during mixing or during heating to a temperature above its softening point. The expression "pressure produced by the foaming agent" is to be understood as the pressure which is set up at the temperature used. If an organic liquid or a gaseous compound which is below the critical pressure is used as foaming agent, the pressure of the foaming agent corresponds to the vapor pressure of the foaming agent which is set up above the mixture of styrene polymer and expanding agent.

The mixture is extruded into a zone of lower pressure. The pressure in this zone should be lower than the pressure of the foaming agent at the prevailing temperature so that the mixture expands. In most cases it is expedient to extrude the mixtures into a zone which is at atmospheric pressure. It may sometimes be advantageous to use a pressure below atmospheric.

To prepare the compositions or molding materials, the synergistic compounds and the organic bromides can be incorporated with the styrene polymer, with or without other components, by any method which ensures homogeneous distribution of the agents in the polymer and does not cause appreciable deterioration or decomposition of any of the components. Incorporation with the styrene polymer may for example be effected on rollers, in an extruder or in a kneader. It is also possible, for example in the production of cast film, to add to the synergistic compound (c) and the organic bromide a solution of the styrene polymer in a solvent, preferably a volatile solvent, such as benzene, acetone or dioxane, and then to evaporate the solvent.

In many cases the synergistic compound and the organic bromide can be added to the monomeric components of the styrene polymers.

It is a particular advantage that the synergistic compound does not interfere with polymerization of the styrene. To prepare the compositions or molding materials according to this invention, the monomeric components of the styrene polymers can therefore be polymerized in the presence of the synergistic compounds and the organic bromides with or without a foaming agent. By this method a particularly homogeneous dispersion of the organic bromide and the synergistic compound in the styrene polymer is obtained. The styrene and the comonomer mixed with an organic bromide, a synergistic compound and preferably a foaming agent may be polymerized in bulk, i.e., in the absence or substantial absence of an inert diluent or solvent for the styrene polymer, or advantageously suspended in an inert liquid medium, e.g. at temperatures between 65 and 130° C. and in the presence of a peroxygen catalyst, such as benzoyl peroxide, acetyl peroxide or hydrogen peroxide.

The synergistic compound (c) has the adavntage that it is safe to handle unlike other conventional compounds which increase the flame-proofing effect of the organic bromides. It has been found moreover that the self-extinguishing property is not lost even after prolonged storage at high temperatures. It is however a particular advantage that the synergistic compounds do not act as plasticizers for the styrene polymer and are not volatile. Furthermore the materials do not involve any health hazard.

The self-extinguishing property of moldings prepared from compositions according to this invention can be tested as follows: to test unexpanded materials, moldings having the dimensions 0.1 x 10 x 30 cm., and for testing expanded materials, moldings having the dimensions 0.5 x 15 x 40 cm. are held for five seconds in a gas flame having a height of 40 mm. and the flame is then removed with a gentle movement. The extinction time (in seconds) of the molding after it has been removed from the flame is a measure of its self-extinguishing characteristics. Untreated or inadequately treated molding materials burn away completely after they have been removed from the flame.

The invention is further illustrated in the following examples in which parts and percentages are by weight. In the methods described in the examples, the synergistic compounds given in Table 1 are used.

Examples 1 to 15

In each case 30 parts of polystyrene and specific amounts of an organic bromide and a synergist are dissolved in 100 parts of methylene chloride. 3 parts of pentane is added to the solution. The solution is then poured onto a sheet of glass and the methylene chloride is allowed to evaporate at room temperature. The pentane remains homogeneously dispersed in the mixture. The film thus obtained is foamed in steam at 100° C. and dried in vacuo at 35° C. for twelve hours. The resultant foam sheet is tested by the above method for its self-extinguishing characteristics. The results are given in Table 2 in which HBCH=hexabromododecane, TDPP=tris-(2,3-dibromopropyl)-phosphate, TBE=tetrabromoethane, percent=amount in percent by weight, E=time in seconds required for extinction of the flame.

TABLE 1

| Synergist | Formula |
|---|---|
| a | $CO_3\text{-}C_6H_4\text{-}C(CH_3)_2\text{-}C(CH_3)_2\text{-}C_6H_4\text{-}CH_3$ |
| b | $Br\text{-}C_6H_4\text{-}C(CH_3)_2\text{-}C(CH_3)_2\text{-}C_6H_4\text{-}Br$ |
| c | $C_6H_5\text{-}C(CH_2CH_3)_2\text{-}C(CH_2CH_3)_2\text{-}C_6H_5$ |
| d | $C_6H_5\text{-}C(CH_3)(C_6H_5)\text{-}C(CH_3)(C_6H_5)\text{-}C_6H_5$ |
| e | $C_6H_5\text{-}C(Br)(CH_3)\text{-}C(Br)(CH_3)\text{-}C_6H_5$ |
| f | $C_6H_5\text{-}CH(NO_3)\text{-}CH(NO_3)\text{-}C_6H_5$ |

TABLE 2

| Example No. | Bromide Type | Percent | Synergist Type | Percent | E |
|---|---|---|---|---|---|
| 1 | NBCD | 1.25 | | | 9 |
| 2 | TDPP | 2 | | | (¹) |
| 3 | TBE | 2 | | | |
| 4 | HBCD | 1.25 | a | 0.1 | 1.5 |
| 5 | HBCD | 1.25 | a | 0.5 | 1.1 |
| 6 | TBE | 2 | b | 0.1 | 4.6 |
| 7 | TBE | 2 | b | 0.5 | 2.4 |
| 8 | HBCD | 1.25 | c | 0.1 | 1.3 |
| 9 | NBCD | 1.25 | c | 0.5 | 1.0 |
| 10 | HBCD | 1.25 | d | 0.1 | 1.8 |
| 11 | HBCD | 1.25 | d | 0.5 | 1.3 |
| 12 | HBCD | 1.25 | e | 0.1 | 3.5 |
| 13 | HBCD | 1.25 | e | 0.5 | 2.8 |
| 14 | TDPP | 2 | f | 0.1 | 6 |
| 15 | TDPP | 2 | f | 0.5 | 2.8 |

¹ More than 20 burns.

Similar results are obtained by using, instead of polystyrene, a copolymer of 75% by weight of styrene and 25% by weight of acrylonitrile or a mixture of 100 parts of said copolymer and 5 parts of polystyrene.

We claim:

1. An improved self-extinguishing composition consisting essentially of
   (a) a normally solid thermoplastic styrene polymer containing in chemically combined form at least 50% of styrene and having intimately incorporated therewith
   (b) an organic bromide having a plurality of bromine atoms attached to carbon, said bromine atoms making up more than 40% by weight of the organic bromide, in such an amount that said composition has a bromine content of from 0.1 to 5% by weight and
   (c) from 0.01 to 5% by weight of the styrene polymer of a compound having the formula

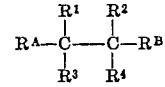

in which $R^A$ and $R^B$ are members selected from the group consisting of an unsubstituted phenyl radical and a phenyl radical substituted by at least one radical selected from the class consisting of an aliphatic hydrocarbon radical having one to three carbon atoms, alkoxy having one to four carbon atoms, chlorine and bromine; $R^1$ and $R^2$ are members selected from the class consisting of hydrogen, chlorine, bromine, the radical of an aliphatic hydrocarbon having one to six carbon atoms, and cyclohexyl; $R^3$ and $R^4$ are members selected from the class consisting of chlorine, bromine, cyano, nitro, the radical of an aliphatic hydrocarbon having one to six carbon atoms, and phenyl.

2. An improved self-extinguishing composition as claimed in claim 1 wherein the organic bromide contains at least four carbon atoms and a plurality of bromine atoms attached to a radical selected from the group consisting of an aliphatic radical and a cycloaliphatic radical, said bromine atoms, constituting more than 40% by weight of the organic bromide.

3. An improved self-extinguishing composition as claimed in claim 1 wherein the styrene polymer is a normally solid thermoplastic addition copolymer of at least 50% by weight of styrene and less than 50% by weight of another readily polymerizable olefinically unsaturated compound selected from the group consisting of acrylonitrile, methacrylonitrile, α-methylstyrene, esters of acrylic and methacrylic acids and alkanols having 1 to 8 carbon atoms, vinylpyridine, N-vinylcarbazole and butadiene.

4. An improved self-extinguishing composition as claimed in claim 1 wherein the styrene polymer is a styrene homopolymer.

5. An improved self-extinguishing composition as claimed in claim 1 which contains as a foaming agent 3 to 10% by weight of the styrene polymer of a volatile organic compound which does not dissolve said styrene polymer and has a boiling temperature below 95° C. at 760 mm. pressure and is selected from the group consisting of aliphatic and cycloaliphatic hydrocarbons, chlorohydrocarbons and fluorohydrocarbons.

6. An improved self-extinguishing composition as claimed in claim 1 wherein compound (c) is 2,3-diethyl-2,3-diphenylbutane.

7. An improved self-extinguishing composition as claimed in claim 1 wherein compound (c) is 2,2,3,3-tetraphenylbutane.

8. An improved self-extinguishing composition as claimed in claim 1 wherein compound (c) is 2,3-dimethyl-2,3-ditolylbutane.

References Cited
UNITED STATES PATENTS 3,058,928 10/1962 Eichhorn et al.
3,210,326 10/1965 Tousignant et al.

MURRAY TILLMAN, *Primary Examiner.*

M. FOELAK, *Assistant Examiner.*

U.S. Cl. X.R.

260—30.6, 32.4, 33.2, 33.6, 33.8, 45.7

U.S. DEPARTMENT OF COMMERCE
PATENT OFFICE
Washington, D.C. 20231

UNITED STATES PATENT OFFICE
CERTIFICATE OF CORRECTION

Patent No. 3,441,524                                        April 29, 1969

Heinz Burger et al.

It is certified that error appears in the above identified patent and that said Letters Patent are hereby corrected as shown below:

Column 6, TABLE 2, second column, line 1 thereof, "NBCD" should read -- HBCD --; same table, under the heading "E", sixth column, line 3 thereof, "----" should read -- (2) --; same column 6, line 48, "[1]More than 20 burns." should read -- [1]More than 20. [2]Burns. --.

Signed and sealed this 28th day of April 1970.

(SEAL)
Attest:

Edward M. Fletcher, Jr.                               WILLIAM E. SCHUYLER, JR.
Attesting Officer                                                 Commissioner of Patents